US008935199B2

(12) United States Patent
Roulland et al.

(10) Patent No.: US 8,935,199 B2
(45) Date of Patent: Jan. 13, 2015

(54) METHOD AND SYSTEM FOR LINKING TEXTUAL CONCEPTS AND PHYSICAL CONCEPTS

(75) Inventors: Frederic Roulland, Le Versoud (FR); Stefania Castellani, Meylan (FR); Nicolas Hairon, Grenoble (FR); Pascal Valobra, Meylan (FR)

(73) Assignee: Xerox Corporation, Norwalk, CT (US)

(*) Notice: Subject to any disclaimer, the term of this patent is extended or adjusted under 35 U.S.C. 154(b) by 656 days.

(21) Appl. No.: 12/967,210

(22) Filed: Dec. 14, 2010

(65) Prior Publication Data

US 2012/0150920 A1 Jun. 14, 2012

(51) Int. Cl.
G06F 7/00 (2006.01)
G06F 17/00 (2006.01)
G06F 17/30 (2006.01)
G06N 5/02 (2006.01)
G10L 15/00 (2013.01)
G10L 15/18 (2013.01)

(52) U.S. Cl.
CPC .... G06F 17/30011 (2013.01); G06F 17/30734 (2013.01)
USPC ........... 707/602; 707/673; 707/722; 707/723; 706/46; 704/257

(58) Field of Classification Search
CPC .............. G06F 17/30619; G06F 17/30914; G06F 17/30917; G06F 19/345
USPC .............. 704/10, 257; 706/12, 14, 45–46, 50, 706/934; 707/722–723, 727–730, 759, 707/765–767, 805
See application file for complete search history.

(56) References Cited

U.S. PATENT DOCUMENTS

| 5,490,089 | A | 2/1996 | Smith et al. |
| 6,983,267 | B2* | 1/2006 | Hamadou et al. ............... 706/59 |
| 7,058,567 | B2 | 6/2006 | Aït-Mokhtar et al. |
| 7,647,534 | B2 | 1/2010 | Castellani et al. |
| 7,715,037 | B2 | 5/2010 | Castellani et al. |
| 7,774,198 | B2 | 8/2010 | Roulland et al. |
| 7,797,303 | B2 | 9/2010 | Roulland et al. |

(Continued)

OTHER PUBLICATIONS

Uzuntiryaki et al. "Effect of conceptual change approach accompanied with concept mapping on understanding of solution concepts" Department of Secondary Science and Mathematics Education, Middle East Technical University, Ankara, 06531, Turkey Instructional Science (2005).*

(Continued)

*Primary Examiner* — Augustine K Obisesan
*Assistant Examiner* — Berhanu Mitiku
(74) *Attorney, Agent, or Firm* — Fay Sharpe LLP

(57) ABSTRACT

A system and a method for linking textual and physical concepts are disclosed. The method includes extracting candidate phrases from a knowledge base for a device, the candidate phrases including noun phrases. A set of candidate concepts is generated, based on the extracted noun phrases. Provision is made, e.g., on a graphical user interface, for a user to generate mapped concepts for physical components of the device by selecting, for each concept to be mapped, a physical component shown in a graphical representation of the device and at least one of the candidate concepts which is to be linked to that physical component. The knowledge base is indexed, based on the mapped concepts. In this way, textual expressions in the knowledge base are linked to a respective physical component through one of the mapped concepts.

21 Claims, 7 Drawing Sheets

(56) References Cited

U.S. PATENT DOCUMENTS

| | | | |
|---|---|---|---|
| 2005/0137843 A1 | 6/2005 | Lux | |
| 2006/0047649 A1* | 3/2006 | Liang | 707/4 |
| 2007/0179776 A1 | 8/2007 | Segond et al. | |
| 2008/0294423 A1* | 11/2008 | Castellani et al. | 704/4 |
| 2009/0106224 A1* | 4/2009 | Roulland et al. | 707/5 |
| 2009/0292700 A1 | 11/2009 | Castellani et al. | |
| 2010/0149571 A1 | 6/2010 | Thieret et al. | |
| 2010/0185689 A1* | 7/2010 | Hu et al. | 707/803 |
| 2010/0229080 A1 | 9/2010 | Roulland et al. | |

OTHER PUBLICATIONS

Aït-Mokhtar, et al. "Robustness beyond Shallowness: Incremental Dependency Parsing," Special issue of NLE journal (2002).

Aït-Mokhtar, et al. "Incremental Finite-State Parsing," Proceedings of Applied Natural Language Processing, Washington, Apr. 1997.

Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, Jul. 1997.

Bratus, et al. "Using Domain Knowledge for Ontology-Guided Entity Extraction from Noisy, Unstructured Text Data," In Proc. AND'09, Jul. 23-24, 2009, Barcelona, Spain.

Castellani, et al. "Designing Technology as an Embedded Resource for Troubleshooting," Journal of Computer Supported Cooperative Work (JCSCW), vol. 18, No. 2-3, pp. 199-227, 2009.

U.S. Appl. No. 12/772,692, filed May 3, 2010, Coursimault, et al.

Coyne, et al. "WordsEye: An Automatic Text-to-Scene Conversion System," In Proceedings of the 28th Conference on Computer Graphics and Interactive Techniques, pp. 487-496, 2001.

Johansson, at al. "Carsim: a system to visualize written road accident reports as animated 3D scenes," in Proceedings of the 2nd Workshop on Text Meaning and Interpretation, pp. 57-64, Jul. 25-26, 2004, Barcelona, Spain.

Parisi, et al. "Ontology-driven Generation of 3D Animations for Training and Maintenance," In Proceedings of the International Conference on Multimedia and Ubiquitous Engineering (MUE'07), 2007, IEEE.

ParallelGraphics/Cortona3D, http://www.parallelgraphics.com/products/ accessed Nov. 12, 2010.

Liang, J. "The troubleshooting task implementation in automotive chassis using virtual interactive technique and knowledge-based approach," Journal of Network and Computer Applications, 31 (2008), pp. 712-734.

Watson, I. "Case-based reasoning is a methodology not a technology," Knowledge-based Systems, 12 (1999), pp. 303-308.

Angeli, et al. "An expert system approach to fault diagnosis in hydraulic systems," Expert Systems, Nov. 1995, vol. 12, No. 4, pp. 323-330.

Henninger, S. "Case-Based Knowledge Management Tools for Software Development," Journal of Automated Software Engineering, vol. 4, No. 1, 1997.

* cited by examiner

METHOD AND SYSTEM FOR LINKING TEXTUAL CONCEPTS AND PHYSICAL CONCEPTS

BACKGROUND

The exemplary embodiment relates to the development of a support system for a device, such as a printer. It finds particular application in connection with a system and method for linking a graphical representation of a device to relevant content of a searchable knowledge base. While the exemplary embodiment is described in terms of a troubleshooting application, it is to be appreciated that the system and method find application in device operation, training, and the like.

Traditionally, users seeking a resolution to problems relating to complex devices, such as printers and computers, often resort to telephoning a service agent for the manufacturer who may seek to diagnose the problem over the telephone. The service agent guides the customer through a troubleshooting sequence that is intended to lead to resolution of the problem or identification of the cause.

More recently, user-operated systems have been made available which provide a user with remote access to a searchable knowledge base (SKB). The SKB may be arranged as a set of cases, each including a problem statement which describes an observed problem with a device and one or more associated solutions which can each resolve at least one cause of the problem. When a user identifies a case which appears to fit the observed problem, one or more of the corresponding solutions are displayed to the user, as a series of steps to be performed on the device.

The SKB is generally navigated by text searching, either free-text or guided search of a list or hierarchy of textual categories or topics. The process of troubleshooting a device often involves a visual inspection of the device in order to identify the failing component or components. However, to make full use of the SKB, the user needs to be able to identify, in words, the physical component, which often has a technical name.

To assist users in making the link between the parts or areas identified on the device and the corresponding terms in the SKB, a system supporting device troubleshooting could provide a virtual graphical view of the device, in addition to the SKB, to help the user to navigate its contents. Without links between the graphical view and the SKB, a user would still have difficulty in utilizing the SKB, since the names used in the graphical view, if any, may be different from the terms used in the SKB. However, building and maintaining this kind of resource may be labor-intensive and prone to error, given the complexity of the devices, the variability of the terminology describing them, and the potentially large size of SKBs. Also, several communities of editors can be involved in the management of parts of these resources, at different times, and may also need to use legacy resources.

There remains a need for a system and method of linking an SKB with a visual representation of the device which assists users lacking expert knowledge in the navigation of the knowledge base.

INCORPORATION BY REFERENCE

The following references, the disclosures of which are incorporated herein in their entireties by reference, are mentioned:

The following references relate to troubleshooting systems: U.S. application Ser. No. 12/772,692, filed on May 3, 2010, entitled A SYSTEM AND METHOD FOR A FLEXIBLE MANAGEMENT OF THE ESCALATION OF SUPPORT TO DEVICES, by Jean-Marc Coursimault, et al.; U.S. Pub. No. 20080294423, published Nov. 27, 2008, entitled INFORMING TROUBLESHOOTING SESSIONS WITH DEVICE DATA, by Stefania Castellani, et al.; U.S. Pub. No. 20090106224, published Apr. 23, 2009, entitled REAL-TIME QUERY SUGGESTION IN A TROUBLE SHOOTING CONTEXT, by Frederic Roulland, et al.; U.S. Pub. No. 20090292700, published Nov. 26, 2009, entitled SYSTEM AND METHOD FOR SEMI-AUTOMATIC CREATION AND MAINTENANCE OF QUERY EXPANSION RULES, by Stefania Castellani; et al.; U.S. Pub. No. 20100149571, Jun. 17, 2010, entitled METHOD AND APPARATUS FOR AUTOMATED CALL ASSISTANCE FOR MALFUNCTIONS IN AN IMAGE PRODUCTION DEVICE, by Tracy E. THIERET, et al.; U.S. Pub. No. 20100229080, published Sep. 9, 2010, entitled COLLABORATIVE LINKING OF SUPPORT KNOWLEDGE BASES WITH VISUALIZATION OF DEVICE, by Frederic Roulland, et al.; U.S. Pat. No. 7,647,534, issued Jan. 12, 2010, entitled METHOD FOR AVOIDING REPETITION OF USER ACTIONS BY USING PAST USERS' EXPERIENCES, by Castellani, et al.; U.S. Pat. No. 7,715,037, issued May 11, 2010, entitled BI-DIRECTIONAL REMOTE VISUALIZATION FOR SUPPORTING COLLABORATIVE MACHINE TROUBLESHOOTING, by Stefania Castellani, et al.; U.S. Pat. No. 5,490,089 issued Feb. 6, 1996, entitled INTERACTIVE USER SUPPORT SYSTEM AND METHOD USING SENSORS AND MACHINE KNOWLEDGE, by Smith, et al.; and U.S. Pub. No. 20050137843, published Jun. 23, 2005, entitled USING GRAPHICS AS A COMPLEMENTARY INTERACTION MODE IN A MDA-LIKE AUTHORING ENVIRONMENT, by Veronika Lux.

The following relate to natural language processing: U.S. Pat. No. 7,058,567, issued Jun. 6, 2006, entitled NATURAL LANGUAGE PARSER, by Aït-Mokhtar, et al.; U.S. Pat. No. 7,797,303, issued Sep. 14, 2010, entitled NATURAL LANGUAGE PROCESSING FOR DEVELOPING QUERIES, by Frederic Roulland, et al.; U.S. Pat. No. 7,774,198, issued Aug. 10, 2010, entitled NAVIGATION SYSTEM FOR TEXT, by Frederic Roulland, et al.; U.S. Pub. No. 20070179776, published Aug. 2, 2007, entitled LINGUISTIC USER INTERFACE, by Frederique Segond, et al.

BRIEF DESCRIPTION

In accordance with one aspect of the exemplary embodiment, a method for linking textual and physical concepts includes extracting candidate phrases from a knowledge base for a device, the candidate phrases including noun phrases. A set of candidate concepts is generated, based on the extracted noun phrases. Provision is made for a user to generate mapped concepts for physical components of the device by selecting, for each concept to be mapped, a physical component shown in a graphical representation of the device and at least one of the candidate concepts which is to be linked to that physical component. The knowledge base is indexed, based on the mapped concepts, whereby at least some of textual expressions in the knowledge base are linked to a respective physical component through one of the mapped concepts.

In accordance with another aspect of the exemplary embodiment, a system for linking textual and physical concepts is provided. The system includes a candidate phrase extraction module for extracting candidate phrases from an associated knowledge base for a device and for generating a set of candidate concepts based on the extracted noun phrases. The candidate phrases include noun phrases. A graphical user interface generator generates a graphical user interface for a user to generate mapped concepts for physical components by selecting, for each concept to be mapped, a physical component shown in a graphical representation of the device and at least one of the candidate concepts which is to be linked to that physical component. An indexing module indexes the knowledge base based on the mapped concepts, whereby at least some of textual expressions in the knowledge base are linked to a respective physical component through one of the mapped concepts. A processor implements the candidate phrase extraction module, indexing module, and graphical user interface generator.

In accordance with another aspect of the exemplary embodiment, a graphical user interface includes a display device and a user input device. The graphical user interface is configured for displaying a graphical representation of physical components of a device to an editor for selection of a physical component shown in the representation which is to be linked to textual expressions in a knowledge base for the device and for displaying a first list of candidate concepts, the candidate concepts in the first list of concepts being derived from noun phrases automatically extracted from the knowledge base by a parser. A mapped component concept is generated by the editor by selecting a subset of the candidate concepts for the selected physical component. Textual expressions in the knowledge base which then are indexed by the mapped component concept are linked to the physical component.

DETAILED DESCRIPTION

Aspects of the exemplary embodiment relate to a method and computer system for linking textual physical concepts that can assist editors in building a virtual model of a device. The virtual model, when built, can be used to provide a visual (graphical) representation of the device on a user interface to assist the user in navigating a searchable knowledge base (SKB). The virtual model of the device graphically represents the physical components of the device and actions that can be performed on them. The virtual model also provides a mapping of the physical components and actions with the terms used to describe them in the SKB. This enables the physical components and the actions that can be performed on them, and that are mentioned in the SKB, to be dynamically represented in the virtual view of the device while the user navigates the SKB. In the exemplary method, the graphically represented physical components of the virtual view are linked with the description in the SKB by indexing, e.g., tagging the graphically represented components with the corresponding terms in the SKB.

The exemplary system and method help editors to define the physical components of the device and the actions that can be performed on those components, and to map the components and actions with the terms used to describe them in the SKB. The virtual model so obtained can then be used, for example, by a training system, for illustrating a capability of a device, or by a troubleshooting system, such as that described in U.S. Pat. No. 7,715,037, for guiding a non-expert user during troubleshooting sessions by showing components and actions on the graphical representation, which are linked to the textual content of the SKB.

The exemplary system includes an editing tool, which employs a semi-automatic approach for assisting a human editor in linking the components of the device and related actions which can be performed on those components with textual expressions defined in pre-existing textual documentation of the device, such as a SKB. Candidates for names of physical components of the device and related actions are extracted from such textual documentation and presented to the user through the editing tool, allowing the user to link physical concepts, which refer to the device components and actions, with textual concepts, each textual concept including one or more textual expressions occurring in the SKB. A natural language processing (NLP)-based technique is used for extracting the candidate names for components of the device and related actions and indexing the mapped component concepts and mapped action concepts. The exemplary NLP method uses a combination of syntactic structure and co-reference analysis.

Figure 1:
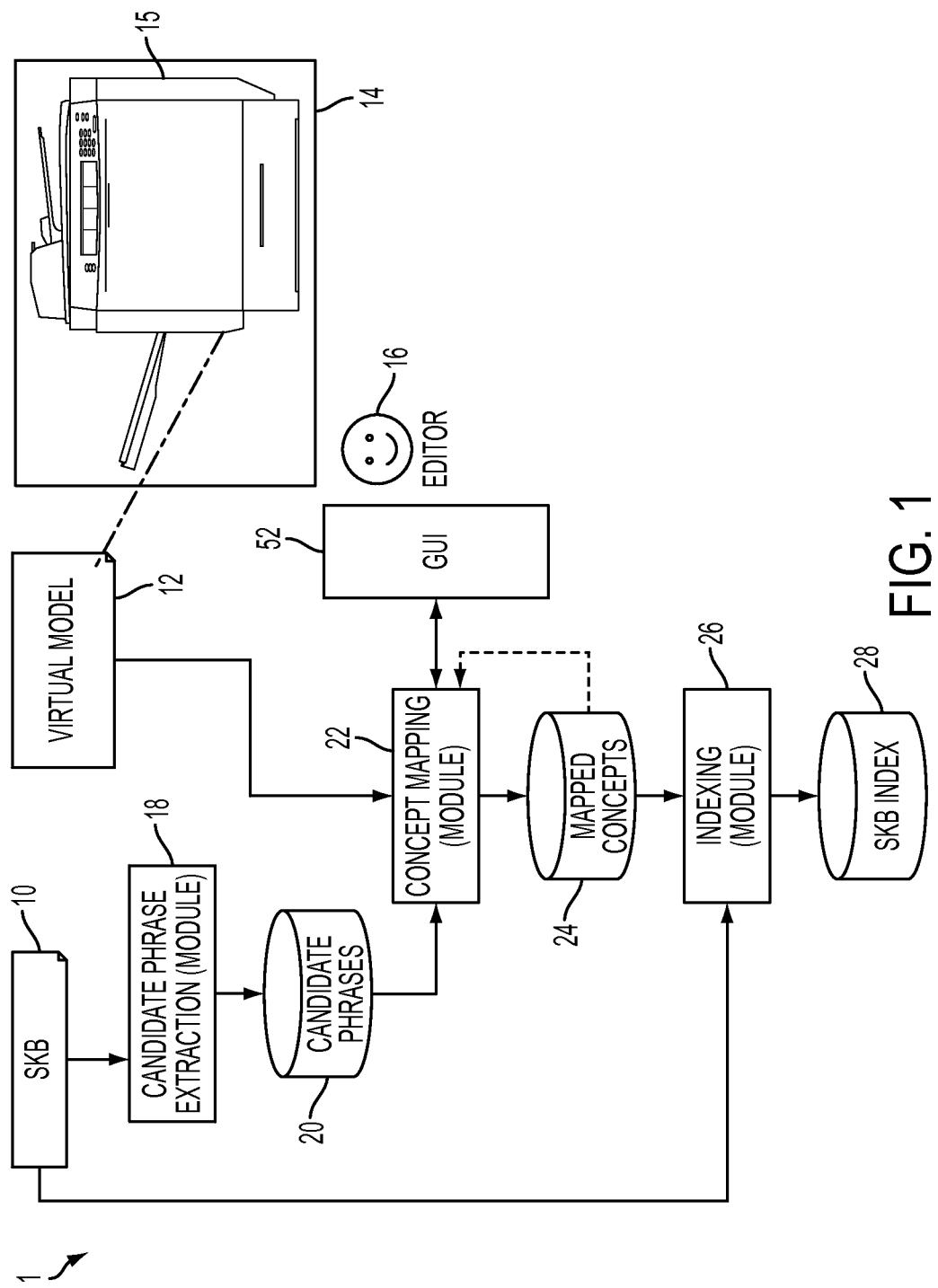
FIG. 1 is a diagrammatic overview of the exemplary system and method in accordance with one aspect of the exemplary embodiment.

With reference to FIG. 1, an overview of the exemplary editing system 1 and method is shown. The system 1 assumes that textual documentation on the device which serves as a troubleshooting resource, such as an SKB 10, and a virtual model 12 for generating a graphical representation 14 of a device 15 have already been defined and stored in memory. In the exemplary embodiment, the device 15 is a printer or a multifunction device (MFD) with printing as well as other functionality (such as one or more of copying scanning, faxing, and the like). Users of the exemplary system 1, that is, human editors 16 of the troubleshooting resources 10, 12, are helped to link semantic information to the virtual model 12 and to link it with the textual resources 10 documenting information on the device.

In order to support the editor task, the exemplary system 1 includes a candidate phrase extraction module 18, which extracts candidate phrases 20 from the textual content of the SKB 10. The extracted candidate phrases 20 are the basis for candidate concepts to be presented to the editor and which are potentially appropriate as names of physical components of the device 15 and for actions that can be associated with these components. A concept mapping module 22 of the system controls interaction with the editor 16. The concept mapping module 22 serves as an annotation system when the device visual representation 14 is displayed to the editor. In particular, the concept mapping module 22 assists the editor 16 in selecting appropriate candidate component concepts for associating with physical components of the device, which are shown in the graphical representation 14 of the device, and candidate action concepts for related actions on them. The physical components and actions (together referred to as "physical concepts") displayed in the graphical representation are mapped 24 to the SKB content through the candidate concepts selected for the components and actions ("textual concepts"). Once the editing is completed, an indexing module 26 of the system 1 indexes the contents of the SKB 10 based on the mapped concepts to form an index 28 for future use in support of the users of the SKB 10, which may be expert or non-expert users.

As will be appreciated, the physical components of the device 15 and actions which can be linked to the SKB 10 in this way are only those parts of the device and actions on them which are visualized in the graphical representation 14.

Figure 2:
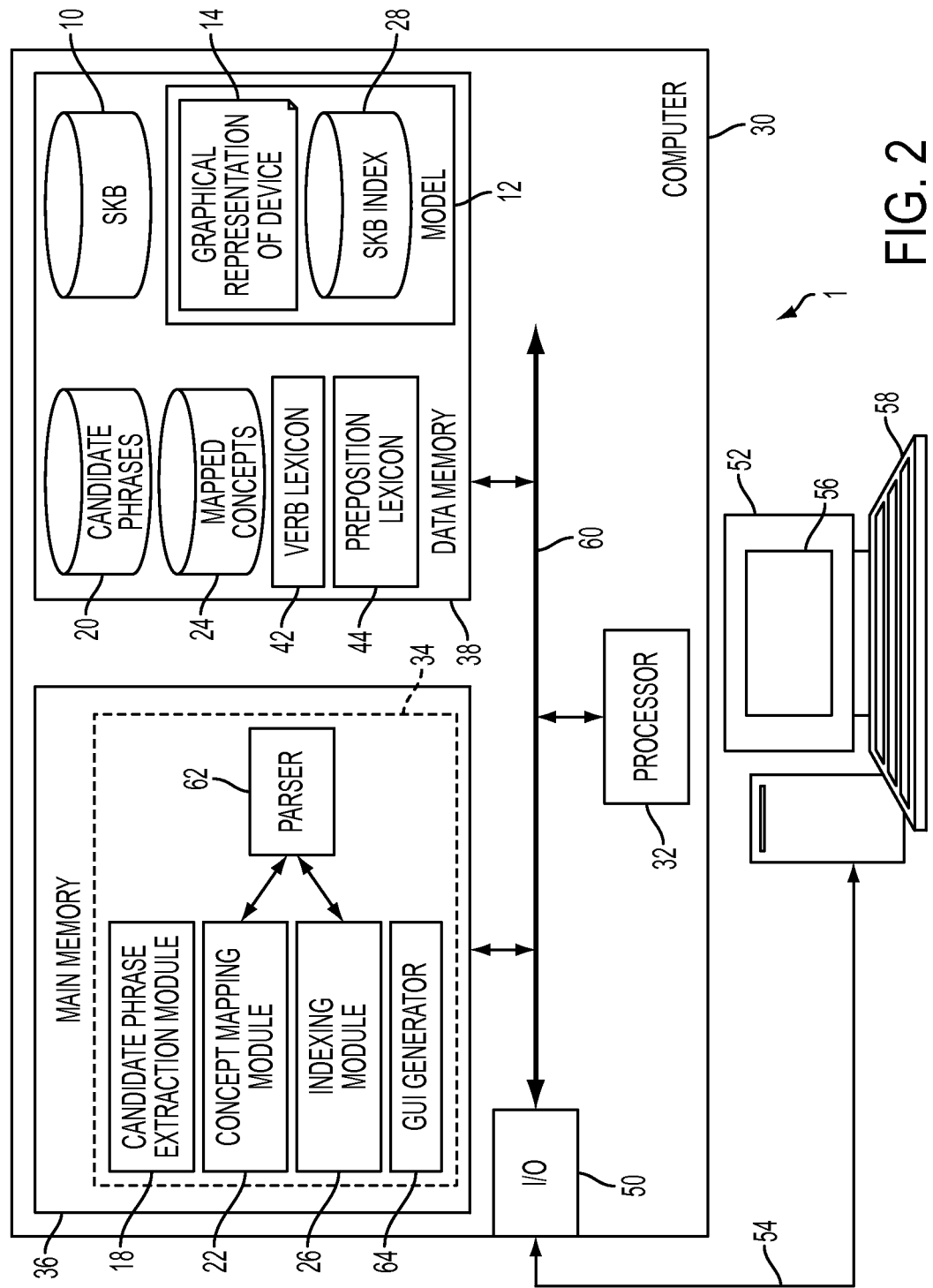
FIG. 2 is a functional block diagram illustrating a system for linking textual and physical concepts in accordance with another aspect of the exemplary embodiment.

FIG. 2 illustrates one embodiment of the exemplary computer system 1, which includes a computing device 30. The illustrated computing device 30 includes a processor 32, which controls the overall operation of the system 1 by execution of processing instructions 34 which are stored in main memory 36 connected to the processor 32. Data memory 38, which may be resident on or communicatively connected with computer 30, stores SKB 10, and model of the device 12, as well as the candidate phrases 20, mapped concepts 24, and SKB index 26 that are generated during the method.

A verb lexicon 42 comprising a predefined set of accepted verb phrases and a preposition lexicon 44 comprising a predefined set of accepted preposition phrases may also be stored in memory 38. As will be appreciated, lexicons 42 and 44 may be combined into one. A "lexicon" is used herein to mean a data structure, program, object, or device that indicates a set of words that may occur in a natural language. A lexicon may be said to "accept" a word it indicates, and those words may thus be called "acceptable" or may be referred to as "in" or "occurring in" the lexicon.

An input/output interface 50, such as a modulator/demodulator (MODEM), enables the computer to communicate with an editing tool 52 such as a graphical user interface (GUI), via a wired or wireless link 54, such as a cable, telephone line, local area network or wide area network, such as the Internet. GUI 52 may include, for example, a display screen 56, and one or more user input devices 58, such as a keyboard, keypad, cursor control device, touch or writable screen, combination thereof, or the like, for communicating user input information and command selections to the processor 32, such as inputting text and/or selecting from drop down menus. The various components 32, 36, 38, 50 of the computer 30 may be all connected by a bus 60. As will be appreciated, the exemplary system 1 may be implemented through cloud computing, where components need not be resident on a single computing device.

Figure 3:
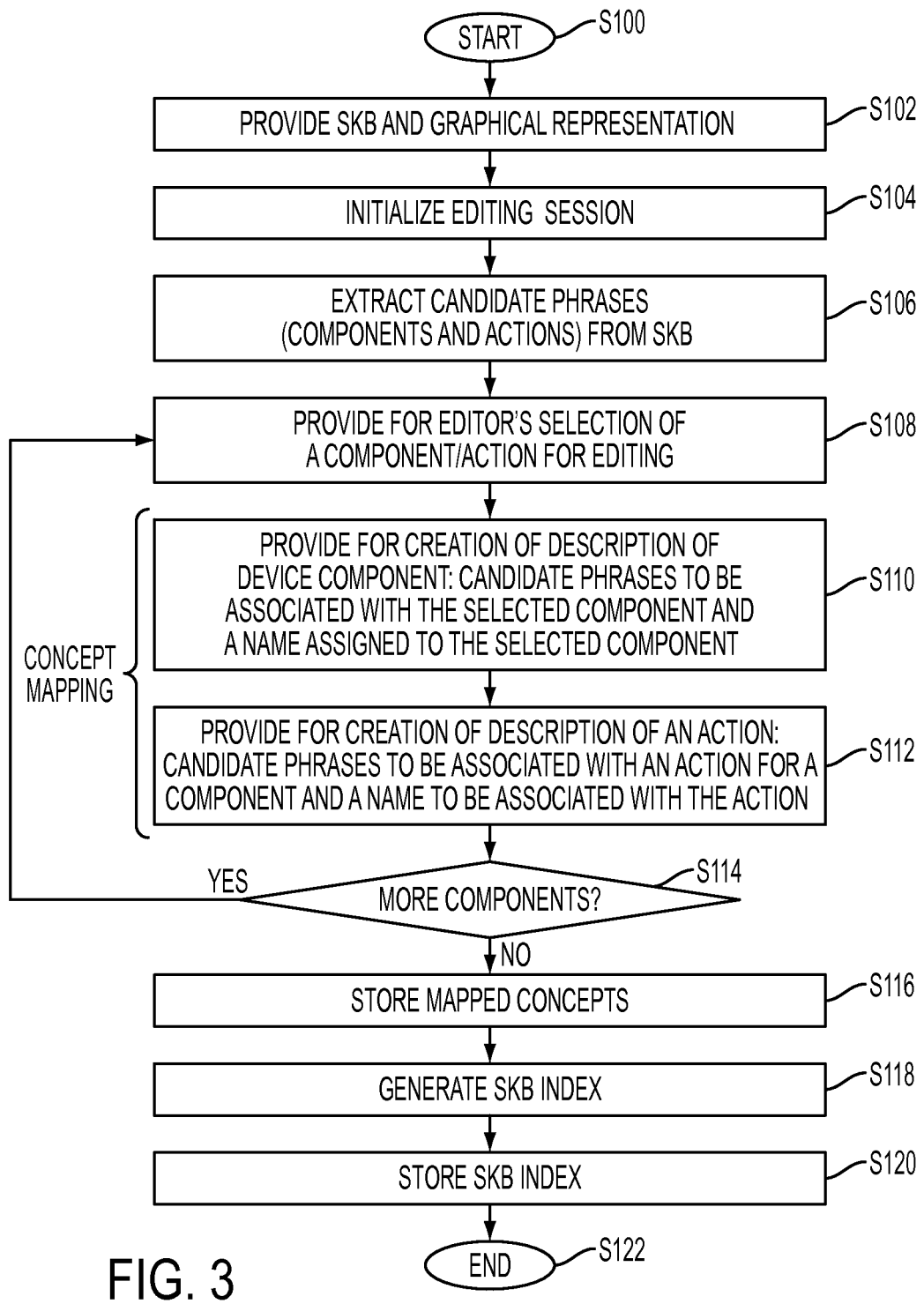
FIG. 3 is a flow diagram illustrating a method for linking textual and physical concepts in accordance with another aspect of the exemplary embodiment.

The digital processor 32, in addition to controlling the operation of the computer 30, executes instructions 34 stored in memory 36 for performing the method outlined in FIG. 3. In particular, the instructions 34 include the candidate phrase extraction module 18, concept mapping module 22, and indexing module 26 mentioned above. The three modules 18, 22, 26 support the interaction of the editor 16 with the system, as described in greater detail below. The modules 22, 26 may incorporate or have access to a syntactic parser 62 for processing the textual content of the SKB 10. A GUI generator 64, which may be a part of the concept mapping module 22, generates one or more visual editing screens in cooperation with the editing tool 52 and modules 18, 22, 24, and receives user inputs from the editing tool. As will be appreciated the instructions 34 are shown as various modules for ease of illustration. However, they may be variously combined or separated.

The computer 30 may be a PC, such as a desktop, a laptop, palmtop computer, portable digital assistant (PDA), server computer, cellular telephone, or other computing device capable of executing instructions for performing the exemplary method.

The memory 36, 38 may comprise any type of non-transitory computer readable medium such as random access memory (RAM), read only memory (ROM), magnetic disk or tape, optical disk, flash memory, or holographic memory. In one embodiment, the memory 36, 38 comprises a combination of random access memory and read only memory. In some embodiments, the processor 32 and memory 36, 38 may be combined in a single chip.

The digital processor 32 can be variously embodied, such as by a single-core processor, a dual-core processor (or more generally by a multiple-core processor), a digital processor and cooperating math coprocessor, a digital controller, or the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer implemented system 1. Since the configuration and operation of programmable computers are well known, they will not be described further.

FIG. 3 illustrates the exemplary method of linking textual and physical concepts. The method begins at S100.

At S102, an SKB 10 and device visual representation 14 for the same physical device (e.g., for a particular model of printer) are provided in memory 38.

At S104, an editing session is initialized. For example, an editor 16 initializes an editing session via the editing tool 52. The system 1 recognizes that an editing session has begun.

At S106, candidate phrases 20 are extracted and stored. In particular, when an editing session is initialized, the candidate phrase extraction module 18 is launched and it extracts, from the SKB 10, all of the candidate phrases 20 that potentially refer to device components or actions which may be performed on these physical components and stores them, in a normalized form, in memory 38.

Figure 4:
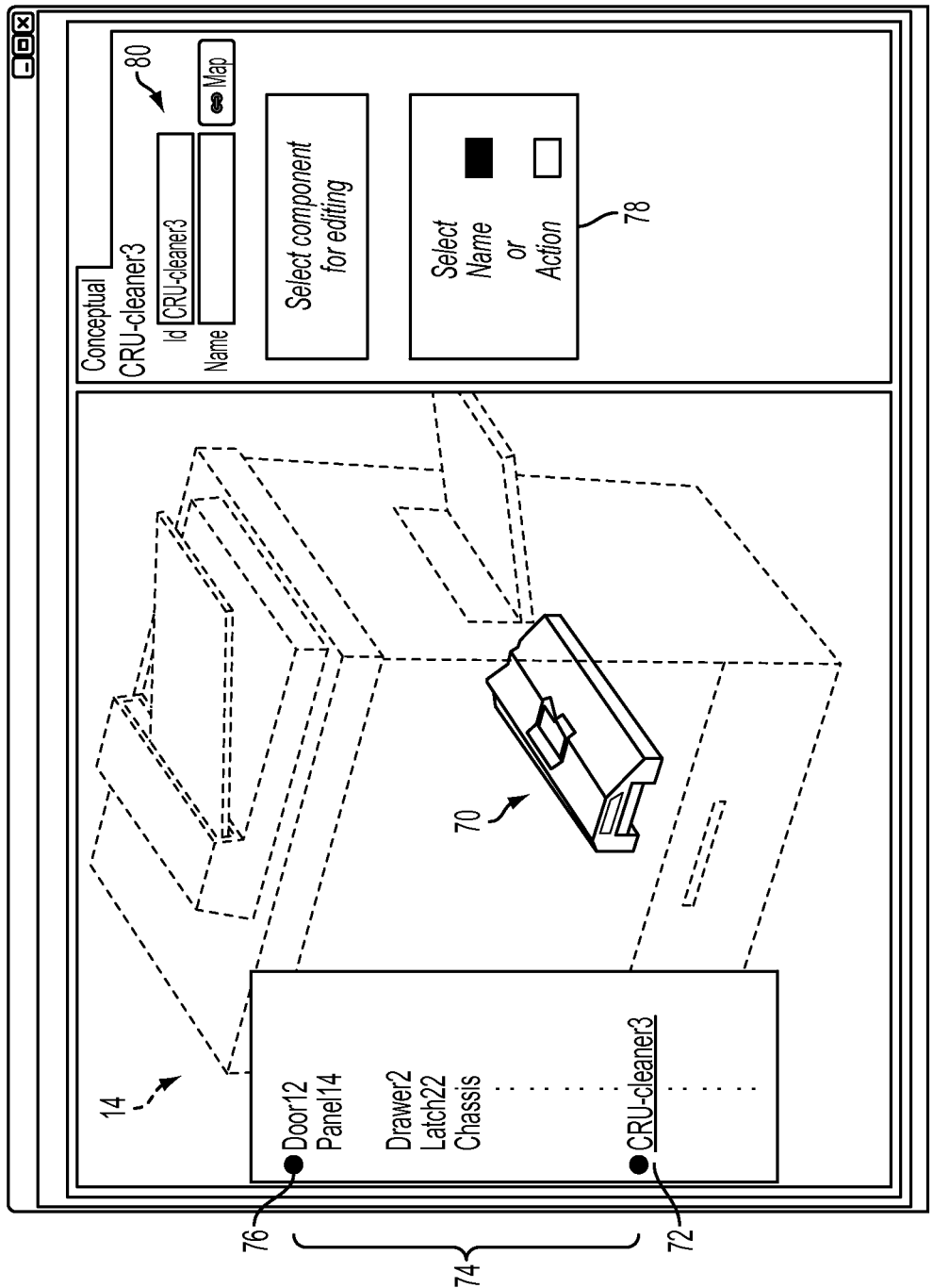
FIG. 4 illustrates a screenshot of a user interface showing a virtual representation of a device.

At S108, provision is made for the editor 16 to select a physical component of the device for editing. For example, as illustrated in FIG. 4, using editing tool 52, the editor may click on a component 70 displayed in the visual representation 14 or select its predefined identifier 72 in the visual representation from a displayed list 74. The selection information is conveyed from the tool 52 to the concept mapping module 18.

At S110, provision is made for the editor 16 to interact with the system 1 to attach a textual description to the component 70. In particular, the concept mapping module 22 interacts with the editor 16 whereby the editor selects candidate phrases from the set of candidate phrases 20 extracted from the SKB at S106 to be associated with the component 70 as textual concepts and for the selection of a single textual expression to define the component's name. These textual expressions may be suggested by the system 1 and may comprise the candidate phrases 20 that have been extracted as candidate component names from the SKB 10. Each proposed textual expression may thus include one or more words. This step is described below, with reference to FIG. 5.

At S112, provision is made for the editor 16 to interact with the system 1 to attach a textual description for one or more action(s) associated with the component 70, as described below with reference to FIG. 6. Once again, the concept mapping module 22 interacts with the editor 16 whereby the editor selects candidate phrases from the set of candidate phrases 20 extracted from the SKB at S106 to be associated with the physical (action) concept as textual concepts and for selection of a textual description to define the name of the action. The candidate textual descriptions are suggested by the system 1 and include candidate phrases 20 that have been extracted as component associated actions from the SKB 10.

As will be appreciated, rather than first editing the description of a component (S110) and then the description of the associated actions (S112), the editor may chose to reverse the steps. In this case, the editor first edits the description of one or more of the actions for the component and then the description of the component.

If at S114, there are more components, the editor may be asked to return to S108 for the next component.

Once the editor 16 has indicated that he has completed the annotation of all (or at least some of) the descriptions of device components and their respective actions, at S116, these are stored in the mapped concept database 24.

At S118, an SKB index 28 is generated based on the mapped concept database 24. In particular, the indexing module 26 uses the database 24, in conjunction with SKB content 10, to create the SKB index 28. The SKB index 28 stores the location in the SKB of each reference to a device component name or to a related action on this component.

The generated SKB index 28 is stored in memory (S120) and provides links between the textual content of the SKB and the graphical representation. These links can be exploited in various ways, as described in greater detail below.

The method ends at S122.

The method illustrated in FIG. 3 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the exemplary method.

Further details of the system and method will now be described.

The Searchable Knowledge Base (SKB)

The exemplary SKB 10 contains information and instructions related to the particular device which is represented in the graphical representation 14. The SKB 10 can be any electronic database containing searchable text in a natural language, such as English or French. It may be a structured database. In the specific examples described herein, the SKB includes problem statements and corresponding solutions. Each problem statement and its corresponding solutions may be referred to as a "case" or "document." A problem statement may be a short textual description of a known problem with a device that users may experience, and is linked to one or more solution statements which describe steps for solving the problem. For example, a problem statement may be the single sentence which describes a problem. In the case of a printer, for example, an exemplary problem statement may be "White lines when making copies from the document glass and document feeder." The solutions can each comprise a sequence of one or more steps for a user to perform in attempting to solve the problem. A solution sequence may be composed of at least two parts: a title, which basically describes what needs to be done, and a description, which gives step by step instructions to the user to fix the problem. Since a problem identified by a user may have more than one root cause, problem descriptions in the database may include more than one solution sequence, which may be ordered in a list. Additionally, two or more problem descriptions may be associated with the same solution.

The SKB 10 may be initially indexed according to the content of the problem statements only, or the content of both the problem statements and solutions. For example, the SKB may be indexed according to the normalized forms of the words that occur in the problem descriptions, and optionally also their synonyms. Alternatively, the problem statements may be stored as hypertext documents, such as extensible markup language (XML) documents, which are annotated with tags, which link the problem statements to the associated solutions.

In use, a search engine can be configured for retrieving cases which include one or more words of a user's query and presenting them to the user in a ranked order. Here, the user may be a non-expert user, rather than an editor. When the user finds a problem statement/solution which addresses a perceived problem, the user may review the proposed solution statement and then end the query session. If the search engine does not retrieve any responsive documents, the user may try another query and so on through several iterations until the user finds what he is looking for and ends the session, or ends the session without doing so.

In the exemplary embodiment, the SKB 10 includes problem descriptions and associated solutions relevant to the device, which are navigable through visual as well as text searching. The user is assisted in navigating the SKB by exploring the visual representation of the device 14.

The Visual Representation of the Device

The visual representation 14 of the device 15 may include a 2D or 3D representation. The visual representation may include at least the physical components of the device that will be visible or actionable by a user in the context of use and/or repair. In the case of a printer, for example, such a representation 14 may include components such as paper storage trays, access doors, moveable levers and baffles for accessing jammed sheets in the paper path, marking media replaceable containers, such as toner cartridges or ink containers, and waste toner receptacles, other replaceable items, such as cleaning units, photoreceptor belts, and fuser roll heaters, finisher components, such as collection trays, stapling devices, and the like. As well as visualizing these components, the 3D representation 14 visualizes appropriate user actions, such as opening doors, turning levels, lifting baffles and so forth which may be used to access and/or repair a component, e.g., in the form of an animation. The 3D visual representation 14 can be based, for example, on COLLADA™ open source software. This software application is a 3D graphics description format based on XML. The computed 3D model can be rendered by a viewer, such as one based on Adobe™ Flash technology, which offers 3D capabilities and which may be extended with additional 3D libraries, such as PAPERVISION 3D™.

The model 12 may be operative to create representations 14 of more than one device, through combining geometric shapes, such as polygons, circles, etc. from which the representation 14 is built, as well as textures for recreating surfaces. The 3D representation 14 uses a collection of points in a 3D scene, which are connected by various geometric shapes, such as triangles, lines, curved surfaces, and the like. With other virtual objects such as texture, camera viewpoint, and optionally the lighting involved in a 3D scene, the model 12 can provide a view in three dimensions (left-right, up-down and forward-backward), and allow manipulation of the 3D representation 14 to give the user a realistic visual experience. The 3D representation 14 generally has several levels of view so that in a troubleshooting context, for example, the 3D model 14 is navigable using different levels of detail. The inner parts of the model are not visible initially, but can be displayed as appropriate for navigation of the device. For example, a door will hide interior parts that will be revealed only when the door is opened and the particular area of the model is zoomed.

Components in the representation 14 may each have an identifier 72, which is the unique name for that component in the representation.

Candidate Phrase Extraction (S106)

The candidate phrase extraction module 18 extracts, from the SKB content 10, those candidate phrases 20 that are likely to describe components of the device or actions on those components. Each extracted candidate phrase 20 may be a single word or a sequence of two or more words. Two classes of phrase are extracted in the exemplary embodiment: noun phrases, as candidate phrases referring to a component itself, and verb phrases, as candidate phrases referring to actions on the components. In general, each extracted noun phrase (NP) includes at least one noun as its head, which may be accompanied by one or more modifiers, such as an adjective and/or determiner (e.g., the, a). In general, each verb phrase (VP) includes at least one verb which is found in the verb lexicon 42.

Exemplary module 18 uses a combination of syntactic analysis and co-reference analysis in order to extract the candidate phrases 20. Once the syntactic and co-reference analysis are completed, the candidate phrases are each normalized into a textual expression. Each textual expression may be composed of a concatenation of the lemmas of each adjective, noun, and verb composing the phrase. Candidate textual concepts which each include at least one of these textual expressions are finally stored in the database 20 that is later used to present the candidate concepts for the specification of descriptions (name and selected concepts) of components by the editor 16. Two methods for extraction of candidate phrases which may be used individually or in combination in the exemplary method are now described:

A. Extraction of Candidate Phrases Using Syntactic Structure

The candidate phrase extraction module 18 uses the syntactic parser 62 in order to process the text contained in the SKB 10. For each sentence of the SKB, the parsing may result in a syntactic tree representing the sentence and a list of syntactic dependencies between the words of the sentence. In a syntactic tree, the root represents the full sentence, branches represent noun phrases, verb phrases, and the like (which can have further branches from them), and leaves represent the individual words. From this result, candidate phrases may be extracted according to one of the following two rules:

1. Verbal Phrase And Direct Object

When a verbal phrase that contains a verb that can refer to a physical action and that is followed by a direct object is found, the direct object is considered as a candidate phrase referring to a component ("candidate component") and the verb as an candidate phrase referring to an action associated to this component ("candidate action"). The lexicon of verbs 42 is used to decide whether a particular verb refers to a physical action. For example in the sentence:

Pull out the tray extension to accommodate larger paper sizes

The module 18 extracts two candidate phrases: tray extension, as a candidate component and Pull out, as a candidate action that can be performed on this component.

2. Noun Phrase Following Preposition

When a prepositional phrase begins with a preposition generally used with physical objects (such as "of") is encountered, the noun phrase following this preposition is considered as a candidate component. For example, in the sentence:

Locate the latch on the right side of the center Feed Roll Cartridge.

The module 18 identifies the preposition of and then extracts the noun phrase: center Feed Roll Cartridge as a candidate component. As with the verbs identified as actions, a lexicon 44 of prepositions and prepositional phrases, which includes prepositions that are used with physical objects (on, in, over, under, through, behind, etc.), may be accessed to determine whether a labeled preposition is a preposition which is accepted by the system 1 for this rule.

B. Extraction of Candidate Phrases Using Co-Reference

Module 18 includes a co-reference analysis module, which may be part of the syntactic parser 62 grammar, to extract co-referents. These are additional noun phrases or pronominal phrases in the document that refer or are likely to refer to the same entity as the one referred by a candidate component phrase extracted through syntactic rules, as described in section A above.

The module 18 of the exemplary system 1 is therefore able to construct candidate phrases referring to components as a set of phrases where the phrases are co-referent noun phrases. This set defines the various expressions that a unique underlying textual concept can take. For example in the paragraph:

To replace an empty Cleaning Unit: . . . Open the Front Door and locate the Cleaning Unit a candidate component will be identified as the set {empty clean unit, clean unit} which are the two co-referent expressions detected in the text as a potential component name. Note that because of lemmatization, cleaning becomes clean in the stored candidate concept.

Using this technique through the whole SKB content, the module 18 may extract candidate phrases which are redundant, that is two candidates where one is a subset of the other. In this case, only the superset is considered as a candidate textual description since it provides a richer definition of the potential expressions of the underlying textual concept. The candidate composed of a subset of expressions is discarded from the set of candidates. For example, in the previous example, when the module 18 extracts {empty clean unit, clean unit}, if another candidate {clean unit} was extracted earlier, e.g., in another document, the candidate {clean unit} is removed from the list of candidates and only {empty clean unit, clean unit} is retained.

The co-reference relationship may also be used to extract candidate actions associated with an identified candidate component. When one of the identified co-referents, either a noun phrase or a pronominal phrase, is a direct object of a verb that refers to a physical action and which is in the lexicon 42, this verb is added to the list of candidate actions for the component. For example in the sentence:

Squeeze the latch and then lift it up

Squeeze is a candidate action for the latch. Additionally, Lift up is a candidate action for the latch since it can be analyzed as referring to the latch.

Taking into account co-reference relationships in this way allows capturing of a more complete set of potential actions. Since actions are likely to be introduced in a description of a solution in the SKB in a logical order where the full name of the component may be mentioned only once and referred to as it for later actions, the later actions may never be identified otherwise.

At the end of the extraction phase, the system 1 has created, from the analysis of the SKB contents, a set of candidate components. These candidate components are defined by a set of normalized expressions and are associated, in some cases, with a set of candidate actions, each being represented as well by a normalized expression. Note that in the exemplary embodiment, verbal phrases are extracted as candidate actions only in association with a respective candidate component. Thus a candidate action has to be linked to a respective candidate component. The candidate components and linked candidate actions ("candidate textual concepts") are stored in the candidate phrases database 20.

Concept Mapping (S110, S112)

The concept mapping module 22 supports the editor 16 when he or she is mapping the candidate components and candidate actions (candidate textual concepts) extracted from the SKB 10 with the physical components 70 of the device and associated actions (physical concepts) that are represented in the graphical representation 14 to generate mapped concepts.

In one embodiment, the candidate phrases database 20 is supplemented with candidate concepts which have been selected by the same or different editor(s) for the names of components/actions for devices other than the current device 15. This assumes that different devices may contain similar components and that the system 1 can therefore benefit from the editing work on a previous model. In this embodiment, the candidate components of the candidate phrases 20 are provided at S110 from the combination of the candidate components created by the candidate phrase extraction module 18 and the components defined by editors using the system 1 for other devices than the current one being edited. This is an advantage, for example, when the current device and the prior device are both printers having many similar components.

The two sources of candidate components can be merged as follows: When one candidate component is a subset of the other, a candidate component is created from the union of the two sets of expressions. The actions that were associated to each candidate component are merged following the same principle and the resulting set of actions is associated to the merged candidate component. For example, if a prior editor selected the name cleaning unit for a component name and the current device list includes the candidate component {empty cleaning unit, cleaning unit}, the merged candidate {empty cleaning unit, cleaning unit} is generated. Finally, the concept mapping module 22 of the system 1 will keep only the candidate components and actions coming from the automatic extraction from the SKB or which result from a merge. As will be appreciated, if the components of a prior device are not present in the current model 12 and thus are not referenced in the SKB, they will not be added to the list of candidate textual concepts.

In the case of a candidate component resulting from a merging, it may be flagged as a manually validated one. The sorting of the displayed list of candidate components may put the candidate components that were manually validated first, on the assumption that since they were previously used to define a physical component, they are more likely to be a good definition of it.

In addition, the system 1 can look at the identifiers 72 of the graphical elements that were associated with a component in a previous model 12. If the graphical identifier of previously validated candidate component is equal to the identifier of the graphical element of the new model 12 that the editor has decided to link to the SKB, the system 1 can suggest this candidate component as the most probable one, assuming that the graphic designer was reusing an existing design for components which are common to different devices.

In other embodiments, when the system 1 is being used for very different devices, such as a car and a printer, there may be no advantage to supplementing the list in this way.

The editing phase (S110, S112) results in the creation of a mapped concept which links the textual concepts to the physical concept. Once the editor has created a new mapped concept (component or action), the system 1 will store the different elements of the mapped concept description:

1. The name of the mapped concept selected by the user.
2. The set of textual expressions associated with the mapped concept.
3. The identifier of the physical concept in the model 12.
4. In the case of a component, the set of associated actions, and in case of an action, the related component.

Figure 5:
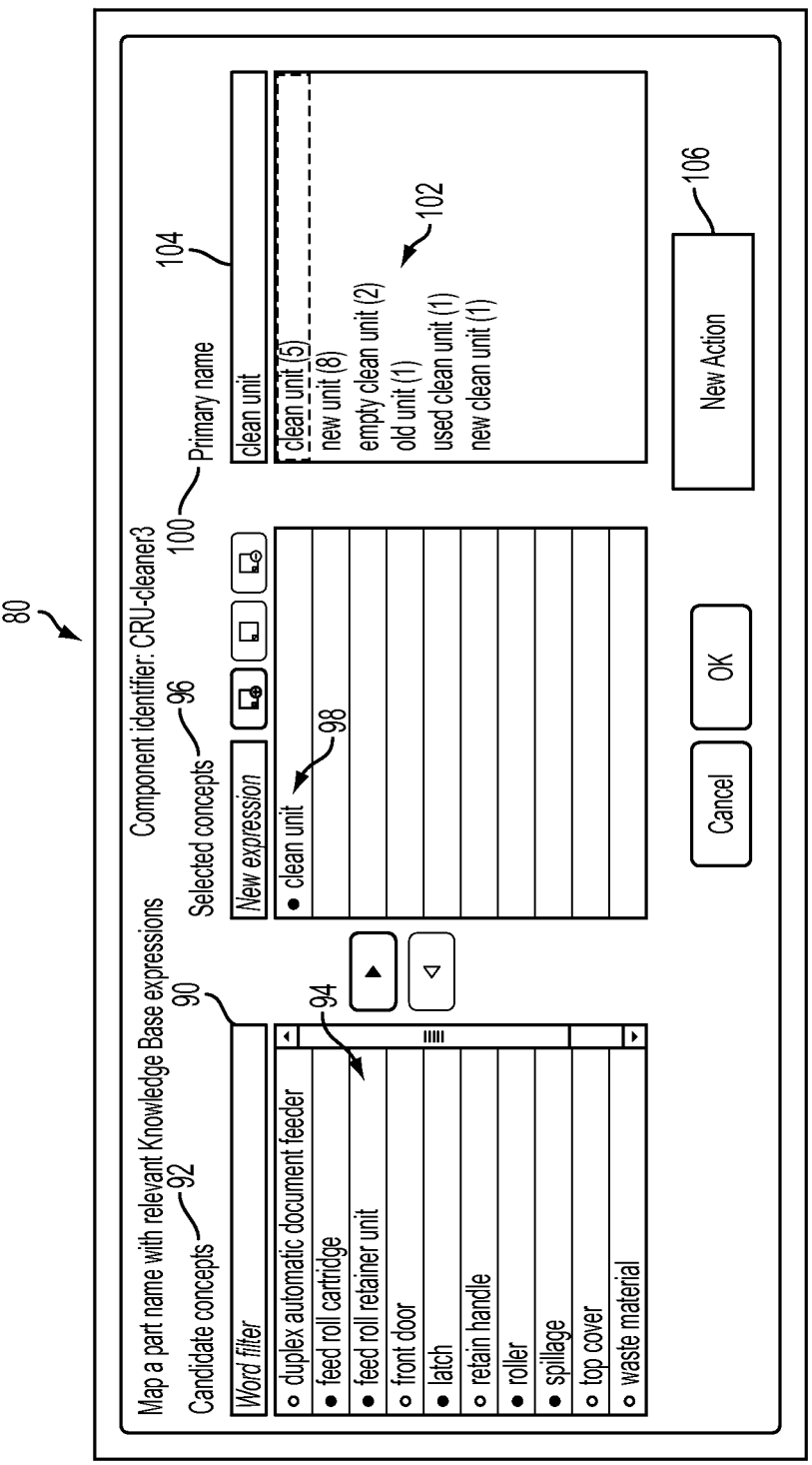
FIG. 5 illustrates a screenshot of the user interface showing a component name editing window.
Figure 6:
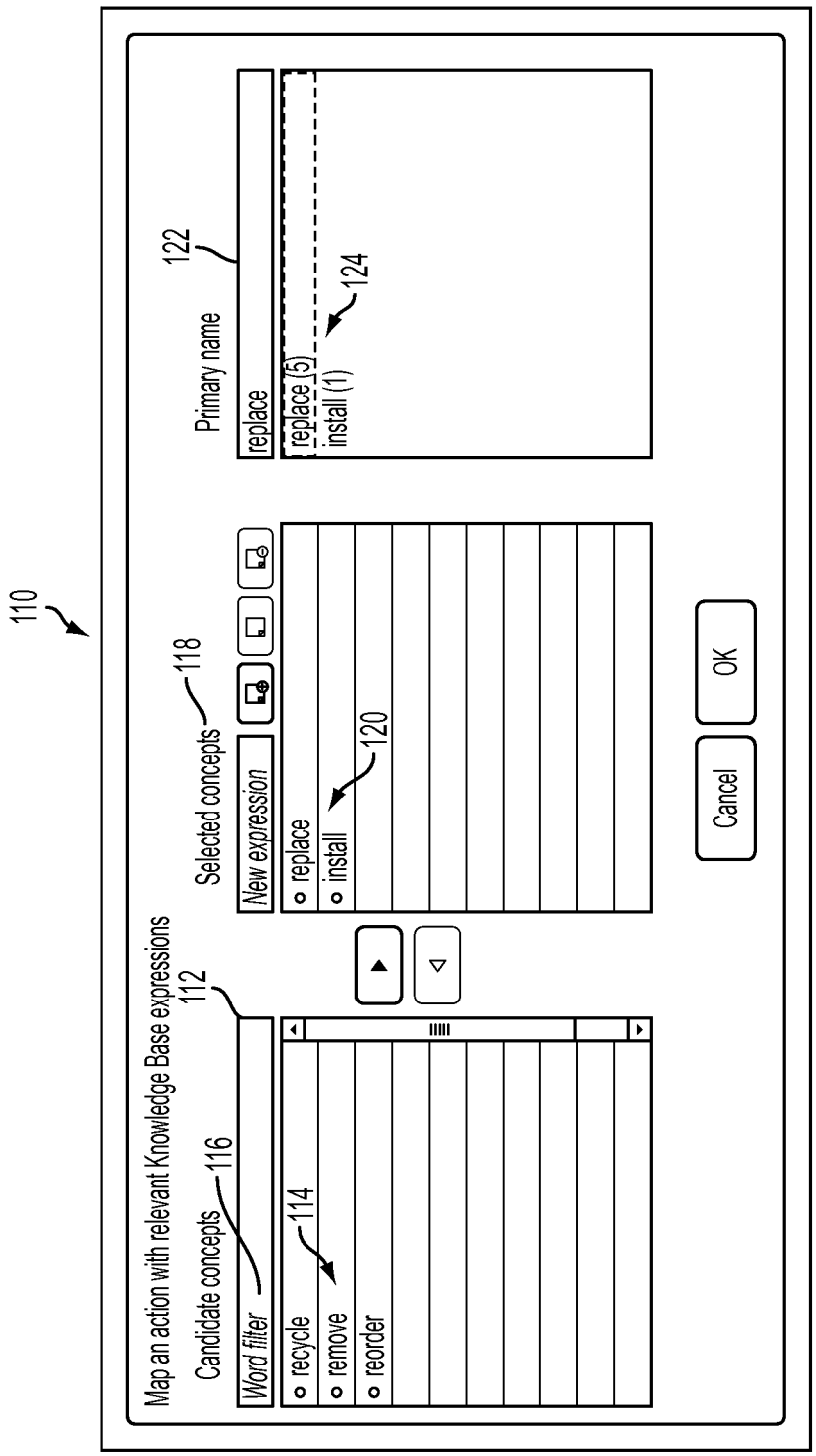
FIG. 6 illustrates a screenshot of the user interface showing an action name editing window.

FIGS. 5 and 6 illustrate exemplary editing windows which may be presented to the editor in the concept mapping stage. The interactions of the editor during the concept mapping stage will now be described in greater detail.

Editor Interaction (S108-S112)

As will be appreciated, the editor 16 is usually an expert who has a detailed knowledge of the device (or of other, similar devices) rather than an end user, such as a customer who has obtained the device for use, and is not as familiar with its operation. However, it is also contemplated that an editor may be any person.

The editor 16 starts with a new model 12 of a device or an already existing model for which descriptions of at least some of the physical concepts, that is, names and actions, need to be specified in order to link them to the SKB 10. As illustrated in FIG. 4, the user may view the graphical representation 14 and select a displayed component 70 for editing. As will be appreciated, the list 74 of identifiers 72 may be a list of names, reference numbers, alphanumeric codes, combinations thereof, or the like, which have been assigned to the components by a graphic designer. The system may display these identifiers on the 3D representation of the printer with the cleaning unit part highlighted. For convenience, this view may be displayed together with a menu 78 that allows the user to select whether to edit a component or an action associated with it. Having selected a physical concept, the user proceeds to specify the name of the component and the actions that should be associated to it in the virtual model 12. Initially, the component is associated with an identifier, "CRU-cleaner3" as defined, for example, by a 3D designer or a 3D graphics generation tool.

In some cases, the identifier 72 may also be used in the SKB 10 to refer to the respective component. However, a complete mapping does not exist. In the exemplary embodiment, this means that, for at least some (or all) of the components 70, the respective identifiers 72 are not used in the SKB 10 to refer to the component or the SKB may use other textual descriptions in addition to the identifier. In consequence, the components 70 in the graphical representation 14 cannot be automatically linked to the relevant textual content in the SKB.

Additionally, actions on this component 70 which are available as animations in the visual representation 14 through the operations of the model 12, such as pulling, replacing, etc., may be assigned different identifiers from the action phrases used in the SKB 10. For example, one solution in the SKB may state: insert the new cleaning unit while the model 12 can generate a representation 14 having an animation with an identifier replace associated with the component identifier CRU-cleaner3. In the embodiment illustrated in FIG. 4, the components which have animations associated with them are identified with an animation identifier 76 (here shown as a black circle). The job of the editor 16 is to create the links with the assistance of the system 1. When links are created by the editor through the mapping, these identifiers are linked to the textual expressions used in the SKB. This allows, for example, components to be visualized and highlighted when a user is viewing a solution statement which refers to that component and for the respective animations to be actuated when the user clicks on an action step referring to a respective action which can be animated.

The editor 16 can create a new mapped concept by editing a device component description (selecting its name and textual concepts) and/or associate an action to a component as follows:

A. Creating A Description For A Device Component (S110)

When the editor 16 wants to create a new component description (component name and associated textual concepts), the editor first selects the physical component 70 on the graphical view 14 of the device (FIG. 4, S108), e.g., in an interface 80 provided on the editing tool 52.

For example, in FIG. 4, the user has clicked on the identifier 72 for the cleaning unit component 70, which causes this component to be highlighted in the representation 14 and its associated identifier 72 also to be highlighted in a list of the identifiers of the components shown in the representation (here, underlined, although other forms of highlighting are also contemplated). The user can select, in menu 78, the field for the name of the component or the action(s) to be associated with that component.

This action causes the system 1 to open a form (e.g., a component editing window, as illustrated in FIG. 5) in the editing tool where the editor 16 can specify the name of the component 70 and/or its associated actions. FIG. 5 shows, by way of example, an interface 80 of the editing tool 52 where the editor 16 has already selected, from the 3D representation 14 of a printer, the cleaning unit component 70. The illustrated editing window includes three areas:

1. Candidate Concepts (For Component)

A candidate concepts area 90 displays a text entry box 92 and a list 94. The list 94 shows the entire set of candidate concepts for components suggested by the system 1. This is the list of candidate components generated at S106, after merging has been performed. Each candidate concept in the list includes a set of (normalized) textual expressions occurring in the SKB 10 describing a unique underlying textual concept, generated as described above. The set of textual expressions can be seen in a popup window, for example, when the editor moves a cursor with a cursor control device such as a mouse over a candidate in the list. For example, in the case of clean unit, the editor will see empty cleaning unit, cleaning unit, and so forth.

Optionally, the user can view, for each textual expression, some instances in the SKB 10 where the expression was used to refer to the candidate component. These SKB extracts may have been selected during the extraction of the candidate components/actions and may be displayed in a detail window when the user decides to see the details of a textual expression.

The text entry box 92 allows the editor to filter the contents of the list 94 by entering a beginning of a keyword or a complete one or a set of keywords. Only candidate concepts that have at least one textual expression matching the entered keywords will remain in the list. For example, entering the keyword empty will bring up the candidate concept clean unit in the example above, since empty clean unit is among the textual expressions associated with the concept clean unit. The editor 16 selects the candidate concept(s) that are relevant to the selected physical concept 70 by moving them to the selected concepts area 96. Here, the editor has found only one candidate concept in the list 94 which he thinks refers to the cleaning unit (clean unit) and has moved this textual concept to a list 98 in the selected concepts area 96. If the editor finds other candidate concepts which refer to the same component 70, he moves these to the list 96 also. In this way, a subset of the candidate concepts in the list 94 become selected textual concepts from the SKB 10 that are associated with the physical concept 70 in the graphical representation.

2. Selected Concepts (For Component)

The selected concepts area 96 displays the list of candidate concepts selected by the user 16 as relevant descriptions of the component 70. In one embodiment, the user is permitted to add some expressions manually that he knows are used in the SKB 10 and that were not automatically detected as a candidate concept for the component by the system 1.

3. Primary Name (For Component)

The primary name area 100 shows the name to be chosen to reference the component in the model 12. The system 1 offers the user the opportunity to select this name from within the union of the SKB textual expressions associated to the textual concepts in the selected concepts list 98. These are shown in a list 102. The list may show a measure of the frequency of occurrence of each textual expression in the SKB 10, e.g., as the number of times that the textual expression occurs (the textual expression clean unit occurs five times). By default, the name of the component may be automatically set as the textual expression that is the most frequent, unambiguous expression of the textual concept in the SKB. This may be computed based on the relative occurrence of the textual expression for the textual concept and the global occurrence of the textual expression. The global occurrence is a function of the number of times the textual expression occurs in the SKB. The relative occurrence is the number of times the textual expression occurs in relation to the textual concept as opposed to other textual concepts. For example, the textual expression latch may occur in connection with several textual concepts, such as main door latch, tray latch, latch mechanism and so forth, and thus have a high global occurrence but a low relative occurrence for the particular textual concept, whereas the textual expression main door latch may occur in only one textual concept, and thus have a global occurrence which matches its relative occurrence. In the exemplary embodiment, only unambiguous expressions are considered as candidates for the primary name, i.e., expressions that have a relative occurrence equal to their global occurrence (as in the case of main door latch). From these unambiguous expressions, the system 1 suggests, in a suggestion box 104, the textual expression with the highest global occurrence. In FIG. 5, the concept mapping module 22 has suggested clean unit, because it occurs most often among the unambiguous textual expressions (the textual expression new unit, although globally more frequent, with eight occurrences, has a relative occurrence lower than its global occurrence because it is also found as a textual expression in another candidate concept which the editor has not moved into the selected concepts list for this component). The editor can keep this suggestion 104 as the name of the component, select another expression from the list 102, or enter a free text entry which is different from the expressions in the list. For example, the editor may decide to use the name cleaning unit, which becomes the name for the mapped concept clean unit and is later linked to all instances of the mapped concept clean unit in the SKB 10.

B. Associate An Action To A Component (S112)

The editor can define as many actions as necessary for a given component. For example, when the editor presses the "new action" button 106 on the component form (FIG. 5), or in the menu 78 (FIG. 4), the system 1 opens a window 110 (FIG. 6) on the editing tool 52 where the editor is able to name an action and define the set of associated expressions in the SKB. The action editing window 110 includes three areas (similar to the window 80 for naming a component).

1. Candidate Concepts (For Action)

The candidate (action) concepts area 112 allows the editor to navigate the set of candidate actions that are relevant for the selected component in list area 114. The editor can filter them by entering a beginning of a keyword, a complete keyword, or a set of keywords in text entry box 116. Only candidate actions which have at least one textual expression matching the entered keywords will remain in the list. The editor selects the one(s) that is (are) relevant by moving them to the selected concepts area 118 for actions. Only one action can be defined at a time. Therefore, if the editor selects multiple candidate concepts from list 114, it means that these textual concepts are considered synonymous expressions of the same action. For example, the editor has selected replace and install from the candidate concepts list 114 as referring to the same action. These are placed in the selected concepts list 120.

2. Selected Concepts (For Action)

This area 118 displays the list 120 of candidate concepts selected by the user as relevant descriptions of the action, analogous to the selected concepts area 96.

3. Primary Name (For Action)

The primary name area 122 is analogous to the primary name area 100 for the selection of the component primary name. The primary name for an action is the name to be chosen to reference the action in the model 40. The system offers the editor the option to select this name from within the union of the SKB textual expressions associated to the elements of the selected concepts list 120. By default, the name of the action may be the expression on the list 122 that is the one occurring most often in the SKB, or which is most often associated with the corresponding component. The editor can keep it, select another expression from the list or enter a free text different from the expressions in the list.

The mapped concepts (for actions and components) thus obtained are each stored (S116) in the mapped concepts database 24 in memory 38. This mapping includes the selected textual concept(s), together with its respective name selected by the editor for the component/action and the ID of the component/action in the representation 14. In addition, the mapped concepts describing components can be linked to reflect some physical or spatial relationship between the corresponding components of the device. These links are referred to herein as semantic links. For instance, a latch could be linked to a tray because it is physically linked to this tray in the actual device.

Indexing (S118)

The indexing module 26 generates an index 28 of all the occurrences, in the SKB 10, of the components and actions validated by the editor 16. The index can be stored as a list, as tags, hyperlinks, or the like. When complete, the SKB index 28 may include the following information for each component 70 that the editor has selected to be linked to the SKB:

A unique identifier for identifying the component 70 in the graphical representation A user-selected primary name for that component Other references to that component (derived from the mapped textual concepts)

A link to each instance in the SKB content where the primary name or other name is found For each action which is associated with that component:
A primary name for that action
Other references to that action (derived from the mapped textual concepts)
A link to each instance in the SKB content where the primary name or other name for the action is found.

Similar to the candidate phrases extraction module 18, the indexing module 26 uses a syntactic parser 62 together with or incorporating a co-reference analyzer in order to process the SKB content. The indexing may be performed as follows:

A. Indexing Names of Components

For each of the noun phrases parsed from the SKB content, the indexing module 26 of the system normalizes the noun phrase into a textual expression in the same way as for the extraction of candidate phrases (or uses the previously annotated SKB content). The normalized textual expression is then compared with all the textual expressions of the mapped concepts which have been given a name. If a match is found, the module 26 indexes the normalized textual expression with the mapped concept which has been associated previously (S116) with the same textual expression.

The index 28 can be generated in any form which links the textual expressions to physical concepts (components, actions) and vice versa. For example, the index can include labels, hypertext, or any other suitable link for enabling retrieving the relevant text from the SKB for a component or action in the graphical representation 12 or for presenting a component or action in the graphical representation 14 corresponding to text retrieved from the SKB.

To ensure that the indexing step indexes only those textual expressions that can be linked to a respective one single mapped concept, various rules may be applied, as follows:

1. Unambiguous Matching

When only one mapped concept in the database 24 can be associated with the textual expression, the matching is considered to be unambiguous. The index 28 is then updated with the information that the noun phrase parsed from a sentence of the SKB is associated with the matching mapped concept.

2. Disambiguation Through Co-Reference

If a noun phrase is ambiguous, i.e., it matches several mapped concepts in the database 24, it may still be possible to link it to a single mapped concept through disambiguation. Specifically, when this phrase co-references a previous phrase within a small section of the SKB text, such as a paragraph of a problem or solution, it may be disambiguated using this co-reference information. In particular, if one of the antecedents of the phrase can be associated with a single mapped concept then the phrase will be associated with this mapped concept. For example, consider the paragraph:

Locate the latch on the right side of the center feed roll cartridge.

Pull the latch up and to the left until the cartridge latches vertically.

In this paragraph, the cartridge in the second sentence can be disambiguated as it is detected as a co-reference of the center feed roll cartridge. Thus, it can be associated with a single mapped concept, in database 24, which relates to the center feed roll cartridge component.

Following this rule, each time a noun phrase is unambiguously matched with a mapped concept, the indexing module 26 of the system indexes the phrase and all the co-references of this phrase.

3. Disambiguation Through Semantic Context

In some embodiments, noun phrases which are still ambiguous after using the results of the co-reference analysis may be disambiguated, in some cases, through a semantic analysis of their context. For example in the sentence:

Locate the latch on the right side of the center feed roll cartridge.

Here, latch can be disambiguated as the one being on the right side of the center feed roll cartridge. This disambiguation may be possible only if the relationship between this latch and the center feed roll cartridge has been defined by the editor. For example, the editor may have generated a concept for center feed roll cartridge right side latch.

When a phrase in the SKB can be matched with several concepts in the database, it is denoted as ambiguous. The system 1 then extracts all the phrases that complement and modify the ambiguous phrase. If some of these phrases can be matched with candidate phrases in database 20, these candidate phrases are used to create the semantic context of the phrase in the sentence. The semantic context so obtained is then compared with the semantic links associated with each of the mapped concepts in the database 24. If only one of the mapped concepts together with its semantically linked concepts matches the semantic context of the phrase in the sentence, the phrase will be matched with this mapped concept and the index will be updated accordingly.

If no complete disambiguation can be achieved after steps 1-3 have been performed, it may be assumed that either the concept database 24 does not have sufficient semantic relationships between the concepts or that the content of the SKB 10 itself is ambiguous and relies on some a priori knowledge of the reader to provide the proper interpretation. In this case, the system 1 may skip the indexing of the ambiguous phrase rather than trying to suggest one of the candidate concepts.

In other embodiments, an ambiguous noun phrase may be linked to all or at least some of the mapped concepts to which it is ambiguously matched (e.g., if there are only two or three such mapped concepts).

B. Indexing Actions

For each noun phrase in the SKB content 10 that is unambiguously identified as an instance of a component name in a mapped concept, the system's indexing component also attempts to determine if an action on that component is also mentioned. If the noun phrase is a direct object of a verbal phrase, the system normalizes the textual expression of the verbal phrase and searches among those actions associated with the component to determine if any of them can be matched with the normalized textual expression. For example, consider the sentence:

Squeeze the latch and then lift it up.

Here, the latch and it have both been associated to one mapped concept representing a particular latch on the device. If this mapped concept has been defined with the actions squeeze and lift up, the corresponding verbs in the sentence will be indexed with the component concept and respective actions accordingly.

In one embodiment, it may be assumed that no disambiguation will be required when matching verbal textual expressions with concepts that are actions since the textual expressions are compared only against those action mapped concepts that are associated with one particular component. This is reasonable since, in general, there are relatively few actions for each component (otherwise a non expert user may have difficulty in performing all the actions and in the correct order). Additionally, the actions are often quite distinct, since they may express opposite meanings (e.g., pull/push, remove/replace, etc.).

The Syntactic Parser

The parser 62 generally takes as input text, such as one or more SKB cases, in electronic form, each piece of text including at least one text string, and transforms the input text into annotated text. As used herein, the term "parser," generally refers to all of the annotation processing instructions which may be utilized in the annotation of the text string. The annotation preserves the inner grammatical structure of the text string, allowing for a fast search. In general, the parser includes instructions for syntactically, semantically, and lexically analyzing the text content of the text and identifying syntactic relationships (more generally, dependencies) between lexical units (words or groups of words) in the text.

The exemplary parser applies a set of rules for assigning tags to the text. Specifically, for this application, the parser breaks down each of the text strings into a sequence of tokens, and applies finite state transducers to associate each word or token with lexical information, such as morpho-syntactic information, semantic information, and associated parts of speech. Based on these labels, the parser extracts dependencies in a given text string.

Exemplary methods are developed from dependency grammars, as described, for example, in Mel'čuk I., "Dependency Syntax," State University of New York, Albany (1988) and in Tesnière L., "Elements de Syntaxe Structurale" (1959) Klincksiek, Ed. (Corrected edition, Paris 1969). These rules can be adapted by adding a specific set of rules designed to identify syntactic dependencies between the specified prepositions in the lexicon 44 and their corresponding noun phrases, and the specified verbs in the lexicon 42 and their direct objects, which can be used in the generation of patterns for use in the candidate phrase extraction step. Additionally, the parser can apply a different set of rules for identifying textual expressions to be indexed in the indexing step.

The parser may be an incremental parser capable of performing robust and deep syntactic analysis. An exemplary parser is the Xerox Incremental Parser (XIP), as described, for example, in U.S. Pat. No. 7,058,567 to Aït-Mokhtar, incorporated herein by reference in its entirety, and in Aït-Mokhtar S., Chanod, J. P., Roux, C. "Robustness beyond Shallowness: Incremental Dependency Parsing," Special issue of NLE journal (2002) (hereinafter "Aït-Mokhtar 2002"); Aït-Mokhtar, et al. "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997.

Uses of the Exemplary System And Method

Figure 7:
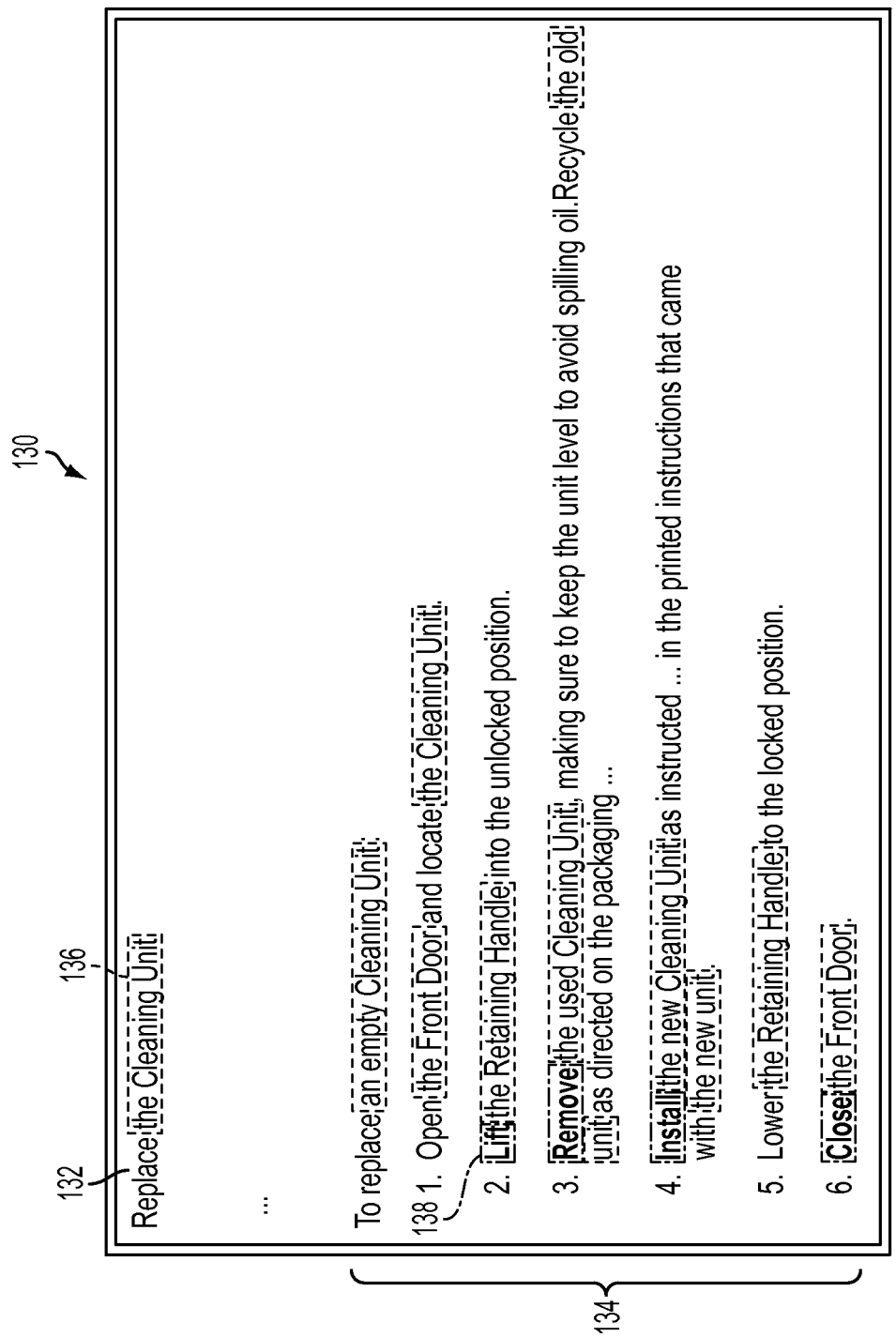
FIG. 7 illustrates a case from the knowledge base with indexed components and actions in a solution highlighted.

The mapping and indexing created by the proposed semi-automated system 1 and method can be used, for example, to provide automatically annotated documentation 130, such as the extract from the SKB 10 which is shown in FIG. 7. A problem statement 132 and its respective solution 132 comprising several steps are shown. Each of the highlighted textual expressions 136, 138, etc. is linked to an underlying respective mapped concept, which can be a component mapped concept or an action mapped concept.

When used in combination with a graphical representation 14 of the device in a troubleshooting environment such as that described in above-mentioned U.S. Pat. No. 7,715,037, the (non-expert) user will see the related component highlighted in the graphical representation 14 when the user clicks on a textual expression in the text describing this component. For example, when the user clicks on any of the expressions cleaning unit, old unit and used cleaning unit, the cleaning unit component 70 is highlighted as illustrated in the graphical representation 14 shown in FIG. 4. The text and graphical representation may be displayed in a side by side view on the user's screen (the editing features shown in FIG. 4 are, of course, omitted in a troubleshooting system). In addition, when clicking on a textual expression related to an action, such as the highlighted lift, install, remove, and close, the graphical representation will be able to play the animation that illustrates the action. In the exemplary embodiment, the component-related textual expressions are highlighted in a different manner from the action-related textual expressions, for example using a different color. In this way, the user can readily see whether a particular highlighted textual expression relates to a component or an action.

Similarly, the user can query the knowledge base by clicking on a component in the graphical representation. A list of cases which include textual expressions linked to that component through the index may be displayed (and/or extracts from those cases). The list of cases may be ranked and/or have been filtered to present more probable cases/solutions first. When a user finds a case which appears to address an actual problem he is trying to correct on the device, the troubleshooting system displays one of the solutions, giving the user the opportunity to click on any of the highlighted text as described above.

The exemplary method and apparatus have advantages over other systems. For example, in Bratus, et al., an ontology-guided entity extraction is used to extract names of mechanical parts of a car from a collection of technician repair notes. (Bratus, et al. "Using Domain Knowledge for Ontology-Guided Entity Extraction from Noisy, Unstructured Text Data". In Proc. AND'09, Jul. 23-24, 2009, Barcelona, Spain). However, this system requires that an existing ontology of all the mechanical components is indexed first. It does not allow a semi-automatic creation of a taxonomy of components and actions that can then be used to index the content, as in the present system. Obtaining a complete and coherent and precise enough model of the domain is however very complex and may often be very difficult to achieve in practice. The exemplary system and method address this issue by providing a semi-automatic way of constructing a simple model that can then be used for indexing the content.

A prototype of the exemplary system has been implemented using a preexisting SKB 10 for a commercial printer, designed for customers to perform troubleshooting on the printer, and a graphical representation 14 of the same printer. The exemplary method is able to generate an index 14 which links the components and actions shown in the representation to the SKB content, which can be used for troubleshooting, as illustrated in FIG. 7.

The exemplary system allows the cost of servicing equipment to be reduced. Customers are provided with a troubleshooting system comprising a model 12 in which links have been created between the graphical representation 14 and the SKB 12 in the SKB index 28. A customer can start with the graphical representation 14 to find a component 70 with which there is a problem or start with a textual search of the SKB 10. Having the graphical representation and SKB linked in this way, the customer is more likely to find and implement a solution to the problem and thus avoid the need for an online session with a technical expert or a service call from a representative.

One of the challenges experienced by people involved in the troubleshooting of a device is the difficulty to relate to the technical terminology in the troubleshooting knowledge base. The exemplary system and method helps to build a troubleshooting system which provides a bridge between a visual experience of the use of a device and the associated technical textual description of a SKB.

While particular reference has been made to troubleshooting, the exemplary system may be integrated with several types of textual resources for support within a company and with systems providing support at multiple levels such as provision of self-help on the web or at a device user interface, provision of support through a remote agent in a help desk or for customer training. For all these applications, benefits of the system and method may include the ability to produce rich multimedia and dynamic support resources instead of primarily textual ones with a low cost of editing.

In addition, the exemplary system can rely on NLP techniques that are generic and can be applied to various types of textual technical documentation which are not limited to any specific device. The method and system presented herein may therefore be applied for efficient production of various types of multimedia and dynamic technical documentation and may be useful to those in the field of technical content authoring.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for linking textual and physical concepts, comprising:
   extracting candidate phrases from a knowledge base for a physical device having physical components, the candidate phrases including noun phrases;
   generating a set of candidate concepts based on the extracted noun phrases;
   providing for a user to generate mapped concepts for physical components of the physical device by selecting, for each concept to be mapped, one of the physical components shown in a graphical representation of the physical device and at least one of the candidate concepts which is to be linked to that physical component, providing for a user to generate mapped concepts for actions associated with the physical components by selecting, for each concept to be mapped, an action shown in a graphical representation of the physical device and at least one of the candidate concepts for an action which is to be linked to that action, which are then stored in a mapped concept database, and storing the user-generated mapped concepts; and indexing the knowledge base based on the stored mapped concepts for physical components, whereby at least some of textual expressions in the knowledge base are linked to a respective physical component through one of the mapped concepts.

2. The method of claim 1, wherein the candidate phrases further comprise verb phrases, each of the verb phrases comprising a verb which is found in a lexicon of preselected verbs and which is associated with an extracted noun phrase, the method further comprising generating a set of candidate concepts based on the extracted verb phrases.

3. The method of claim 2, wherein the preselected verbs have been preselected as referring to physical actions on a device.

4. The method of claim 1, wherein the indexing of the knowledge base is also based on the mapped concepts for actions, whereby textual expressions in the knowledge base are linked to a respective action through one of the mapped concepts for actions.

5. The method of claim 1, wherein the extracting of candidate phrases is performed with a parser.

6. The method of claim 1, wherein the extraction of noun phrases is based on at least one of syntactic structure and coreference.

7. The method of claim 6, wherein the extraction is based on syntactic structure and the extracted noun phrase satisfies at least one rule selected from:
    a rule which is satisfied for a noun phrase which is a direct object of a verbal phrase that contains a verb which refers to a physical action on a device; and
    a rule which is satisfied for a noun phrase following a preposition which is used with physical objects.

8. The method of claim 1, wherein each candidate phrase comprises at least one word.

9. The method of claim 1, wherein the generating of the set of candidate concepts comprises at least one of:
    lemmatizing words in the candidate phrases; and
    combining first and second candidate phrases into one candidate concept, where the second determined candidate phrases is determined to be a coreference to the first candidate phrase in the knowledge base.

10. The method of claim 1, wherein the indexing includes identifying textual expressions in the knowledge base which are unambiguously linked to a single one of the mapped concepts through one of the selected candidate concepts.

11. The method of claim 1, wherein the knowledge base comprises a troubleshooting knowledge base which includes a set of cases, each case including a problem with the device and at least one known solution for that problem and wherein the candidate phrases are extracted from at least one of the problems and the solutions.

12. The method of claim 1, wherein the physical device comprises a printer.

13. The method of claim 1, wherein the providing for a user to generate mapped concepts for physical components comprises:
    displaying a list of candidate concepts for physical components;
    providing for a user to select at least one of the candidate concepts in the list and associate it in memory with an identifier for the physical component and to select a name for the mapped concept.

14. A computer program product comprising a non-transitory recording medium encoding instructions which, when executed by a computer, perform the method of claim 1.

15. A system for performing the method of claim 1 comprising non-transitory memory storing instructions for performing the method and a processor in communication with the memory for executing the instructions.

16. A method for linking textual and physical concepts, comprising:
    extracting candidate phrases from a knowledge base for a physical device having physical components, the candidate phrases including noun phrases, the extraction of noun phrases being based on at least one of syntactic structure and coreference, wherein when the extraction is based on coreference, the extracted noun phrase is extracted as referring to another noun phrase in the knowledge base, the other noun phrase satisfying at least one rule selected from:
        a rule which is satisfied for a noun phrase which is a direct object of a verbal phrase that contains a verb which refers to a physical action on a device; and
        a rule which is satisfied for a noun phrase following a preposition which is used with physical objects;
    generating a set of candidate concepts based on the extracted noun phrases;
    providing for a user to generate mapped concepts for physical components of the physical device by selecting, for each concept to be mapped, one of the physical components shown in a graphical representation of the physical device and at least one of the candidate concepts which is to be linked to that physical component, and storing the user-generated mapped concepts; and
    indexing the knowledge base based on the stored mapped concepts, whereby at least some of textual expressions in the knowledge base are linked to a respective physical component through one of the mapped concepts.

17. A system for linking textual and physical concepts, comprising:
    a candidate phrase extraction module for extracting candidate phrases from an associated knowledge base, the knowledge base comprising problems and corresponding solutions for a device, the candidate phrases including noun phrases, and for generating a set of candidate concepts based on the extracted noun phrases;
    a graphical user interface generator for generating a graphical user interface for a user to generate mapped concepts for physical components of the device by selecting, for each concept to be mapped, a physical component shown on the graphical user interface in a graphical representation of the device and to select at least one of the candidate concepts which is to be linked in memory to that physical component, the graphical user interface generator providing for a user to generate mapped concepts for actions associated with the physical components by selecting, for each concept to be mapped, an action shown in a graphical representation of the physical device and at least one of the candidate concepts for an action which is to be linked to that action, which are then stored in a mapped concept database;
    an indexing module for indexing the knowledge base based on the mapped concepts, whereby at least some of textual expressions in the knowledge base are linked to a respective physical component through one of the mapped concepts; and
    a processor which implements the candidate phrase extraction module the indexing module, and graphical user interface generator.

18. The system of claim 17, further comprising a verb lexicon which includes a predetermined set of verbs and wherein the candidate phrases include verb phrases, each of the verb phrases including a verb which is found in the verb lexicon, each verb phrase being associated in the knowledge base with an extracted noun phrase.

19. The system of claim 17, wherein the knowledge base is a troubleshooting knowledge base which includes a set of cases, each case including a problem with the device and at least one known solution for that problem and wherein the candidate phrases are extracted from at least one of the problems and the solutions.

20. A graphical user interface comprising a display device and a user input device, the graphical user interface configured for displaying a graphical representation of physical components of a device to an editor for selection of a physical component shown in the representation which is to be linked to textual expressions in a knowledge base for the device and for displaying a first list of candidate concepts, the candidate concepts in the first list of concepts being derived from noun phrases automatically extracted from the knowledge base by a parser, a mapped component concept being generated by the editor selecting a subset of the candidate concepts for the selected physical component, whereby textual expressions in the knowledge base which are indexed by the mapped component concept are linked to the physical component, the graphical user interface providing for a user to generate mapped concepts for actions associated with the physical components by selecting, for each concept to be mapped, an action shown in a graphical representation of the physical device and at least one of the candidate concepts for an action which is to be linked to that action, which are then stored in a mapped concept database.

21. The graphical user interface of claim 20, wherein the graphical user interface is further configured for providing for the editor to select an action for the mapped concept for the physical component which is to be linked to textual expressions in the knowledge base for the device and for displaying a second list of candidate concepts extracted from the knowledge base, the candidate concepts in the second list of concepts being derived from verb phrases automatically extracted from the knowledge base by a parser, a mapped action concept being generated by the editor selecting a subset of the candidate concepts for the selected action, whereby textual expressions in the knowledge base which are indexed by the mapped action concept are linked to the action.

* * * * *